Patented Mar. 6, 1934

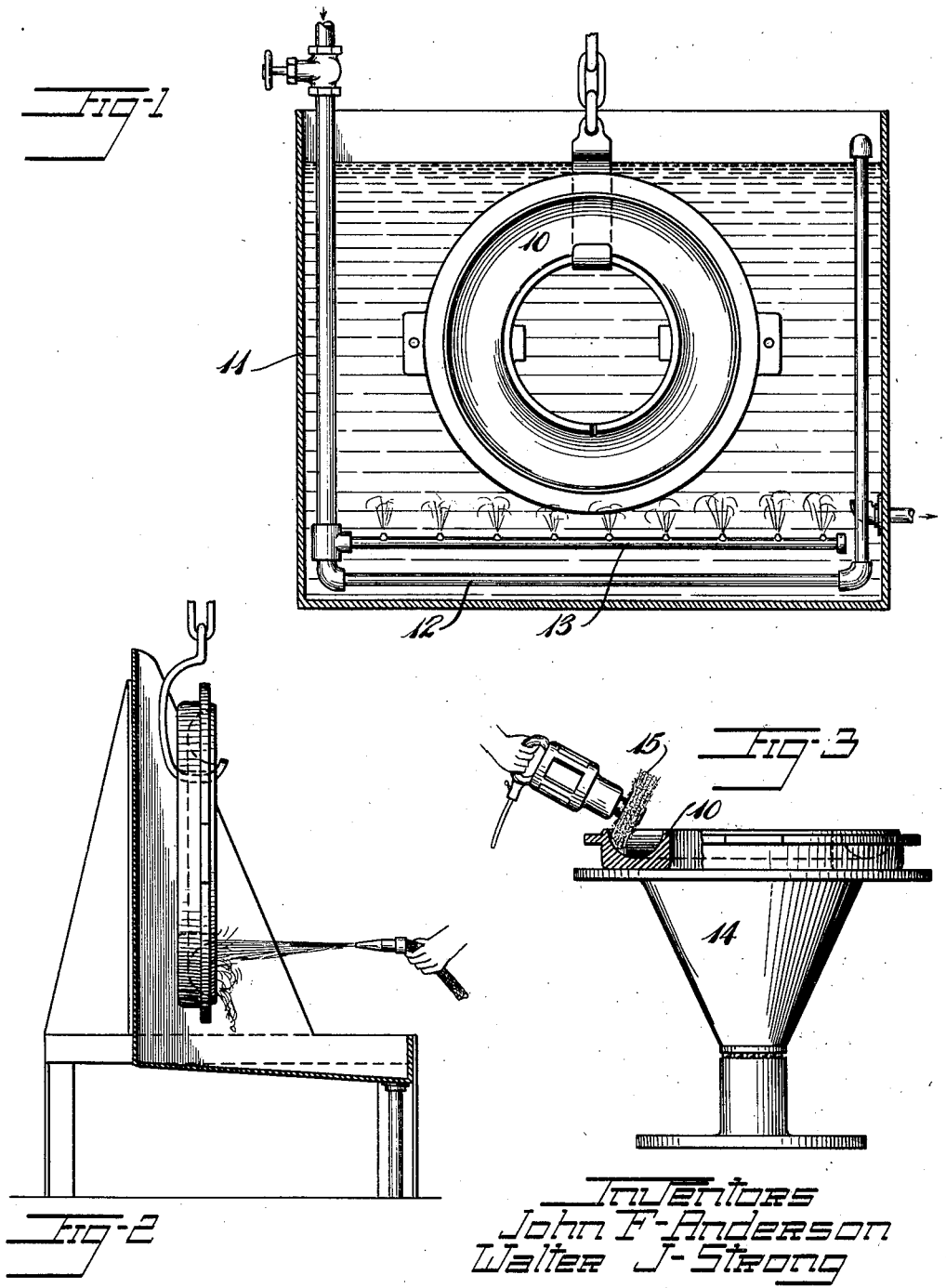

1,950,208

UNITED STATES PATENT OFFICE 1,950,208

METHOD OF CLEANING MOLDS

John F. Anderson, Walter J. Strong, and Maynard F. Torrence, Cuyahoga Falls, Ohio, assignors to The B. F. Goodrich Company, New York, N. Y., a corporation of New York Application October 24, 1933, Serial No. 694,956

6 Claims. (Cl. 15—269)

This invention relates to methods of cleaning molds and is especially useful in the cleaning of molds used in the molding of rubber articles such as tires.

The molds used in molding tires and other rubber articles are usually made of steel and the rubber articles are vulcanized in contact therewith at temperatures of about 275° F. In order to prevent the articles from adhering to the mold the molds are either painted with solutions of soap or other solutions prepared for the purpose or are dusted with soapstone, mica, or other powdered material. When a mold is repeatedly used, a thin film formed of a mixture of rubber and mineral particles with the solid resultant of the painting solution, forms on the surface of the mold and must be removed. The deposits resemble hard rubber and in fact a great percentage of the deposit is found to be vulcanized rubber.

Numerous methods such as sand blasting, boiling in caustic, burning, brushing, and the like have been used in attempts to provide economy in the cleaning of such molds but each has been found to be only partially effective and to involve too much expense.

The principal objects of the present invention are to provide a method of procedure which successfully will accomplish the cleaning of molds and to provide economy and efficiency of operation.

Other objects will appear from the following description and the accompanying drawing, illustrating the preferred manner of carrying out the invention.

Of the drawing:

Fig. 1 is a cross sectional view of a tank used for heating and soaking the molds, with a mold therein.

Fig. 2 is a view showing the step of spraying and cooling the scale.

Fig. 3 is a view showing the brushing step, the mold being shown in section.

Referring to the drawing, the molds 10 are first placed in a tank 11 of boiling fluid where they remain until thoroughly heated. Water may be used as the liquid, but it is found that caustic soda or other cleaning agents containing caustic alkalies have certain advantages thereover as they raise the boiling point of the liquid, dissolve sulfur, saponify oils and greases, prevent oxidation of the metal molds, and probably have some devulcanizing effect upon the rubber deposited on the mold. We have found the following solution to give excellent results:

|  | Per cent |
|---|---|
| Sodium hydroxide | 7.5 |
| Sodium carbonate | 3.0 |
| Linseed oil | .5 |
| Water | 89.0 |
|  | 100.0 |

The linseed oil is saponified during heating of the solution. Other soluble soaps may be used.

The solution may be heated in any desired way. A steam coil 12 immersed in the fluid may be used for this purpose and additional agitation and circulation may be accomplished by a steam jet line 13 in the bottom of the tank.

The molds are preferably left in the solution for at least an hour.

As soon as a mold is removed from the heating tank, where the deposits thereon apparently are softened and expanded by the heat and contact of the liquid, the deposits are chilled while wet by contact with cold water. This is preferably accomplished by spraying cold water on the face of the mold, as shown in Fig. 2, whereby the scale or deposit apparently is shrunk in advance of the heavy body of metal while the water used in spraying serves to keep the scale wet. As a result of the chilling and shrinking of the scale, the scale becomes cracked and blistered and, when the water is projected thereon, a large proportion of the scale is dislodged. For this purpose it is desirable to utilize a jet of water under great pressure.

As soon as the scale has been loosened by chilling it is desirable to immerse the entire mold in cold water to cool the mold and prevent drying and oxidation of the scale. For this purpose the spraying may be done over a tank of water and the mold immersed in the water directly from the spraying step.

When the mold has been cooled to substantially room temperature it is removed to a stand 14 such as that illustrated in Fig. 3 and any remaining scale is removed by brushing the surface with a wire brush 15.

While we have illustrated the cleaning of a tire mold it is apparent that molds for forming other articles may be cleaned by the same method and that the equipment used may be varied to suit the shape and size of the molds.

We claim:

1. The method of removing scale from the surface of a mold which comprises heating the mold with its scale in contact with a liquid adapted to soften the scale, chilling the scale without substantially cooling the mold and without drying the scale, cooling the mold to prevent drying of the scale, and brushing the scale from the mold.

2. The method defined by claim 1 in which the scale is brushed from the mold while the scale is wet.

3. The method defined by claim 1 in which chilling of the scale is accomplished by spraying the scale with water.

4. The method defined by claim 1 in which chilling of the scale is accomplished by spraying the scale with water under high pressure.

5. The method defined by claim 1 in which the liquid used to heat the mold is a solution comprising an alkali.

6. The method defined by claim 1 in which the liquid used to heat the mold is a solution containing an alkali and a soluble soap.

JOHN F. ANDERSON.
WALTER J. STRONG.
MAYNARD F. TORRENCE.